(12) United States Patent
Fujisawa et al.

(10) Patent No.: US 8,761,907 B2
(45) Date of Patent: Jun. 24, 2014

(54) IN-VEHICLE INSTRUMENT OPERATING APPARATUS

(75) Inventors: Yuki Fujisawa, Nisshin (JP); Isao Aichi, Toyota (JP); Ichiro Akahori, Anjo (JP)

(73) Assignee: DENSO CORPORATION, Kariya (JP)

( * ) Notice: Subject to any disclaimer, the term of this patent is extended or adjusted under 35 U.S.C. 154(b) by 358 days.

(21) Appl. No.: 13/069,429

(22) Filed: Mar. 23, 2011

(65) Prior Publication Data

US 2011/0245933 A1    Oct. 6, 2011

(30) Foreign Application Priority Data

Apr. 2, 2010  (JP) .................................. 2010-86073

(51) Int. Cl.
*B60K 37/06*    (2006.01)
(52) U.S. Cl.
USPC ............................................. 700/17; 703/36
(58) Field of Classification Search
USPC ...................... 700/17, 83; 701/2, 36
See application file for complete search history.

(56) References Cited

U.S. PATENT DOCUMENTS

| | | | |
|---|---|---|---|
| 2003/0023353 A1* | 1/2003 | Badarneh | 701/1 |
| 2006/0047386 A1* | 3/2006 | Kanevsky et al. | 701/36 |
| 2006/0052167 A1* | 3/2006 | Boddicker et al. | 463/37 |
| 2010/0087986 A1* | 4/2010 | Lal et al. | 701/36 |
| 2011/0046788 A1* | 2/2011 | Daly et al. | 700/275 |
| 2011/0057785 A1* | 3/2011 | Golomb | 340/475 |
| 2011/0169750 A1* | 7/2011 | Pivonka et al. | 345/173 |
| 2012/0221200 A1* | 8/2012 | Golomb | 701/36 |

FOREIGN PATENT DOCUMENTS

| | | |
|---|---|---|
| JP | A-2005-090062 | 4/2005 |
| JP | A-2005-114177 | 4/2005 |
| JP | A-2007-106353 | 4/2007 |
| JP | A-2008-262274 | 10/2008 |
| JP | A-2009-214749 | 9/2009 |
| JP | A-2009-214750 | 9/2009 |
| WO | 2006134773 A1 | 12/2006 |

OTHER PUBLICATIONS

Office Action mailed Jan. 17, 2012 in corresponding JP Application No. 2010-086073 (and English translation).
Office Action dated Feb. 27, 2013 mailed in the corresponding Chinese patent application No. 201110086635.4 (and English translation).
Office Action dated Aug. 5, 2013 issued in corresponding CN patent application No. 201110086635.4 (and English translation).

* cited by examiner

*Primary Examiner* — Ryan Jarrett
(74) *Attorney, Agent, or Firm* — Posz Law Group, PLC (57) ABSTRACT

An instrument operation apparatus includes a tag reader and a manipulating device. According to a user's manipulation to the manipulating device, the instrument operation apparatus transmits a command signal to one of instruments to operate. The manipulating device includes a detection portion to detect the user's manipulation, and a device information transmission portion to transmit device information according to the manipulation detected by the detection portion using a wireless communications technology. The tag reader includes a reception portion to receive the device information a control circuit to determine a command signal according to the device information received via the reception portion, and a command signal transmission portion to transmit the command signal to the one of the instruments. The instrument operating apparatus is characterized in that an arrangement position at which the manipulating device is arranged or attached is enabled to be changed.

18 Claims, 4 Drawing Sheets

IN-VEHICLE INSTRUMENT OPERATING APPARATUS

CROSS REFERENCE TO RELATED APPLICATION

The present application is based on and incorporates herein by reference Japanese Patent Application No. 2010-86073 filed on Apr. 2, 2010.

FIELD OF THE INVENTION

The present invention relates to an instrument operating apparatus for operating an instrument such as an in-vehicle instrument.

BACKGROUND OF THE INVENTION

[Patent document 1] JP-A-2008-262274

A vehicle is mounted with various in-vehicle instruments such as an air-conditioner, an audio, a navigation system, and a communications terminal. A technology is known which enables a driver to operate an in-vehicle instrument while maintaining a body posture for driving manipulation by arranging a manipulating switch in a steering wheel in addition to a switch attached into the instrument itself. For example, Patent document 1 discloses a technology in which a scroll operation in a map displayed in a car navigation apparatus is enabled by using a switch arranged in the steering wheel.

However, there may be existing various manipulating switches (i.e., manipulating devices) for various in-vehicle instruments in the steering wheel. It may be thereby not so easy to recognize the correspondence or association relation between each manipulating switch and each instrument. The user or driver thus needs to move the sight line from a heading direction of the vehicle so as to confirm the intended manipulating switch at hand. Therefore, it is not so easy to find out quickly an intended manipulating switch.

SUMMARY OF THE INVENTION

The present invention is made in view of the above problem. It is an object of the present invention to provide an instrument operating apparatus which enables an intended manipulating device to be easily found, out.

To achieve the above object, according to an example of the present invention, an instrument operating apparatus, which transmits a command signal to operate an instrument according to a manipulation of a user, is provided as follows. At least one manipulating device includes a detection portion to detect the manipulation of the user, and a device information transmission portion to transmit device information according to the manipulation detected by the detection portion using a wireless communications technology. A reception portion is to receive the device information. A control circuit is to determine the command signal according to the device information received by the reception portion. A command signal transmission portion is to transmit the command signal to the instrument. Herein an arrangement position at which the manipulating device is arranged is enabled to be changed.

Under the above configuration of the instrument operating apparatus, the arrangement position of the manipulating device can be changed. Therefore the user can arrange or attach the manipulating device to the position at which it is easy to manipulate. As a result, for instance, when the user intends to manipulate a predetermined manipulating device while executing driving manipulation, the need to find out the intended manipulating device may be reduced. In addition, this may help prevent the reduction in need for the user to look for the intended manipulating device; the degradation in user's concentration on driving manipulation can be eased.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following describes an embodiment of the present invention with reference to drawings.

1. Configuration of In-Vehicle Instrument Manipulation Apparatus

Figure 1:
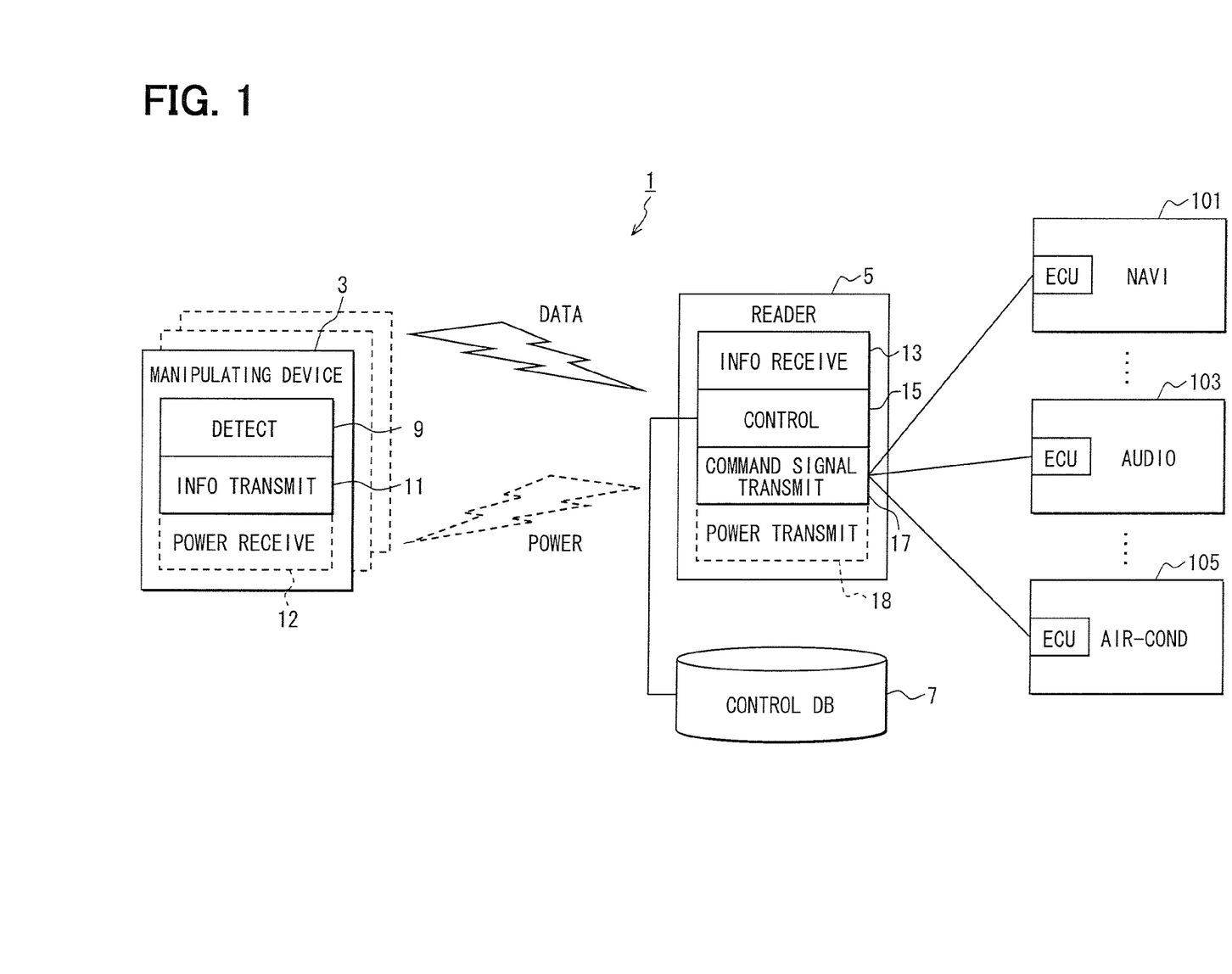
FIG. 1 is a block diagram illustrating an overall configuration of an in-vehicle instrument operation apparatus according to an embodiment of the present invention.

The configuration of an in-vehicle instrument operating apparatus 1 is explained based on FIG. 1. The in-vehicle instrument operating apparatus 1 is mounted in a vehicle and includes a tag reader 5, a control database (DB) 7, and at least one manipulating device 3. For example in the present embodiment, several manipulating devices are included in the in-vehicle instrument operating apparatus 1. The in-vehicle instrument operating apparatus 1 transmits a command signal to an ECU of an in-vehicle instrument such as a navigation system 101, an audio 103, and an air-conditioner 105, using a wireless communications technology. The in-vehicle instrument is operated based on the received command signal. It is noted that a main body of each in-vehicle instrument is equipped with a manipulating portion. Even if there is no in-vehicle instrument operating apparatus 1 each in-vehicle instrument can be therefore operated using the manipulating portion in the own main body.

The manipulating device 3, which also serves as an operating device to operate the instrument, includes a detection portion 9 to detect a manipulation by a user, a device information transmission portion 11 to transmit device information according to the manipulation detected by the detection portion 9 using the wireless communications technology.

Further, the manipulating device 3 may be provided with a power reception portion 12 to receive a power from an outside of the manipulating device 3 using a known non-contact power transmission technology.

The manipulating device 3 is attached to or arranged at a position inside a vehicle compartment of the vehicle. Such an attachment or arrangement position can be varied in the vehicle compartment as needed or freely. It is noted that the arrangement position may be designated so as to enable the tag reader 5 to receive the device information or the like transmitted from the manipulating device 3. It is thus desirable that the attachment position be a position at which the user can easily manipulate the manipulating device 3. The detailed configuration of the manipulating device 3 will be mentioned later.

The tag reader 5 includes a (data) reception portion 13, a control circuit 15, and a command signal transmission portion 17. The reception portion 13 receives device information etc. which is transmitted from the device information transmission portion 11 of the manipulating device 3. The control circuit 15 determines a control action of an in-vehicle instrument using the control database 7 according to the device information or the like received by the reception portion 13; the control circuit 15 then determines a command signal according to the determined control action. The command signal transmission portion 17 transmits the command signal to a corresponding in-vehicle instrument such as a navigation system 101 an audio 103, or an air-conditioner 105.

The tag reader may be further provided with a power transmission portion 18 to transmit energy or an electric power to the manipulating device 3 or the power reception portion 12 using the known non-contact power transmission technology. The tag reader 5 is also arranged in a position also in the vehicle compartment; such an arrangement position can be determined as needed.

The above reception portion 13 is a reader writer for a well-known RF-ID tag (i.e., Radio Frequency Identification tag) to have an antenna, an RF module, a control module etc. which are not illustrated. The process in which the control circuit 15 determines the command signal using the control database 7 is explained in detail later.

2. Configuration of Manipulating Device

The manipulating device 3 may be a button switch 3A, or a ribbon switch 3B, for instance. The in-vehicle instrument operating apparatus 1 may include at least one button switch 3A without having any ribbon switch 3B, or may include at least one ribbon switch 3B without having any button switch 3A. Further, the in-vehicle instrument operating apparatus 1 may include both of at least one button switch 3A and at least one ribbon switch 3B.

Figure 2A:
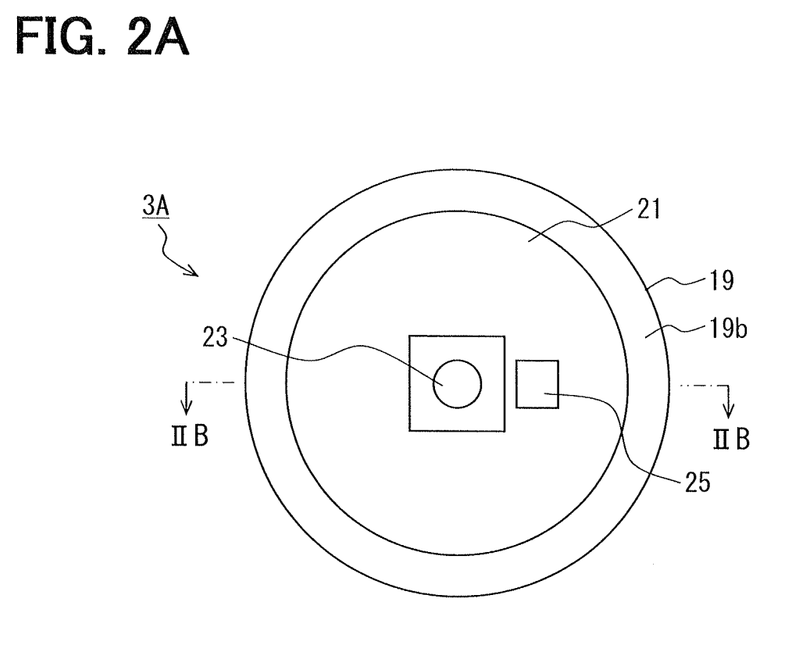
FIG. 2A is a view of a lower surface of a button switch.
Figure 2B:
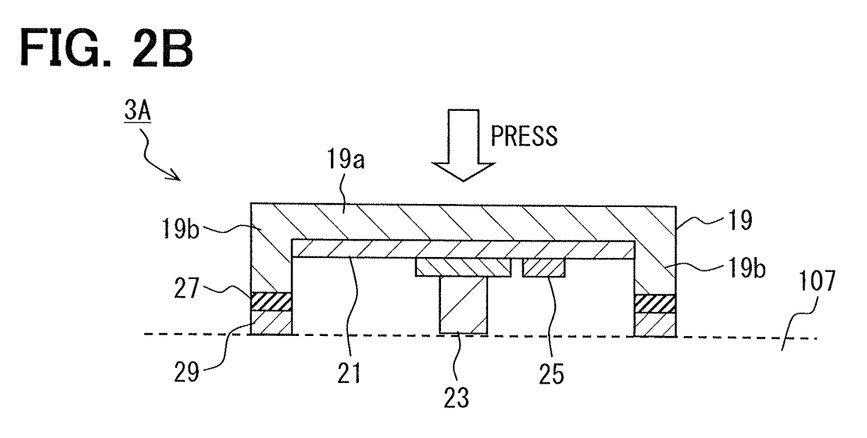
FIG. 2B is a cross sectional view of the button switch taken in a line IIB in FIG. 2A.

First, a configuration of the button switch 3A is explained with reference to FIGS. 2A, 2B. FIG. 2A is a view of the lower surface or bottom of the button switch 3A, and FIG. 2B is a cross sectional view taken in a line IIB-IIB in FIG. 2A. The button switch 3A includes a housing 19, a substrate 21, a tact switch 23, an LSI 25, a shock absorbing material 27, and an adhesive material 29.

The above housing 19 includes a circular disk-like main body portion 19a, and a bank portion 19b protruding downwardly (in FIG. 2B) along all the outer circumferential line of the main body portion 19a. The main body portion 19a is made of a material which has elasticity (for example, resin); thus, the main body portion 19a can be bent or warped when a finger of the user presses downwardly (in FIG. 2B).

The substrate 21 is attached to the lower surface of the main body portion 19a, and tact switch 23 and LSI 25 are further attached to the lower surface of the substrate 21, as illustrated in FIG. 2B. In addition the shock absorbing material 27 and the adhesive material 29 are laminated one by one on the lower surface of the bank portion 19b.

The adhesive material 29 is provided so as to be attached or adhere to an attachment target member 107 that is a member to which the lower surface or bottom of the button switch 3A or manipulating device 3 is attached. The attachment target member 107 is a member which exists in the vehicle compartment (for example, the steering wheel, and the instrument panel). In the state where the manipulating device 3 being attached to the attachment target member 107 is not manipulated, an interval in a space is existing in between the tact switch 23 and the attachment target member 107, thereby maintaining the tact switch 23 in an OFF state (i.e., being not in an ON state). In contrast, when the user pushes or presses the main body portion 19a using a finger downwardly (in FIG. 2B) from the upper surface, the main body portion 19a is bent to thereby cause the tipple of the tact switch 23 to abut to the attachment target member 107; thereby, the manipulation by the user can be detected. That is, the tact switch 23 functions as a detection portion 9.

When the tact switch 23 detects the user's manipulation, the LSI 25 transmits ID information and device information. The ID information indicates an ID unique to the button switch 3A. The device information contains (i) manipulation detection information and (ii) clock time information. The manipulation detection information indicates the detection itself of user's manipulation. The clock time information indicates a clock time when the user's manipulation is detected. It is noted that the LSI 25 is a well-known ID tag, and previously stores an ID unique to the button switch 3A. In addition, the substrate 21 is provided with an antenna of the ID tag, and can transmit the ID information and the device information. That is, the LSI 25 and the substrate 21 function as a device information transmission portion 11.

Figure 3:
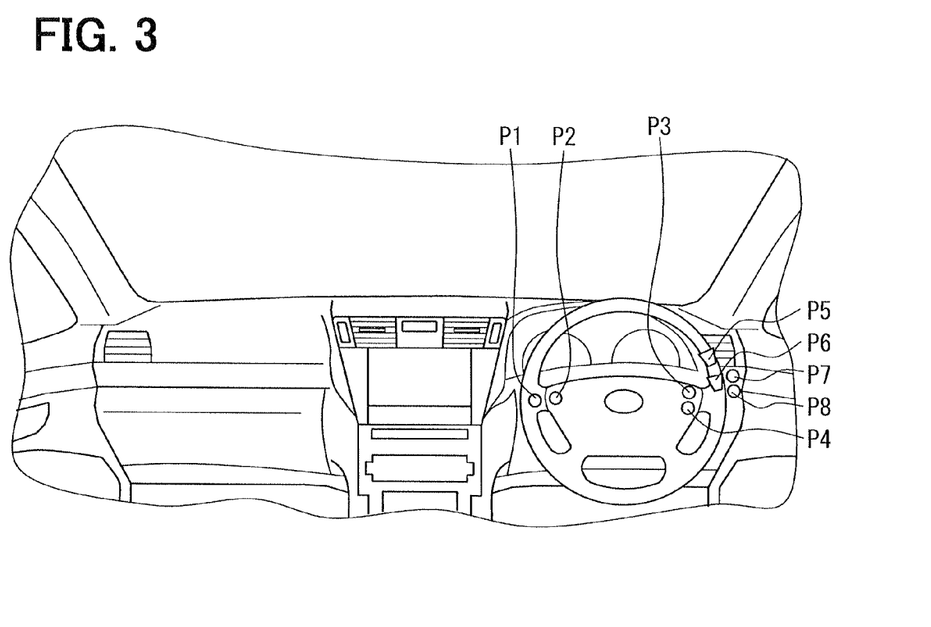
FIG. 3 is a diagram illustrating examples of arrangement positions of manipulating devices.

The button switch 3A can be attached to an optional position in the vehicle compartment with the adhesive material 29 adhering to the attachment target member 107. For example, as illustrated in FIG. 3, any one of positions P1 to P6 on the steering wheel and positions P7 to P8 on an instrument panel can be selected as an arrangement or attachment position. Furthermore, a position other than the positions P1 to P8 in FIG. 3 may be selected as needed as an arrangement position or attachment position.

Figure 4:
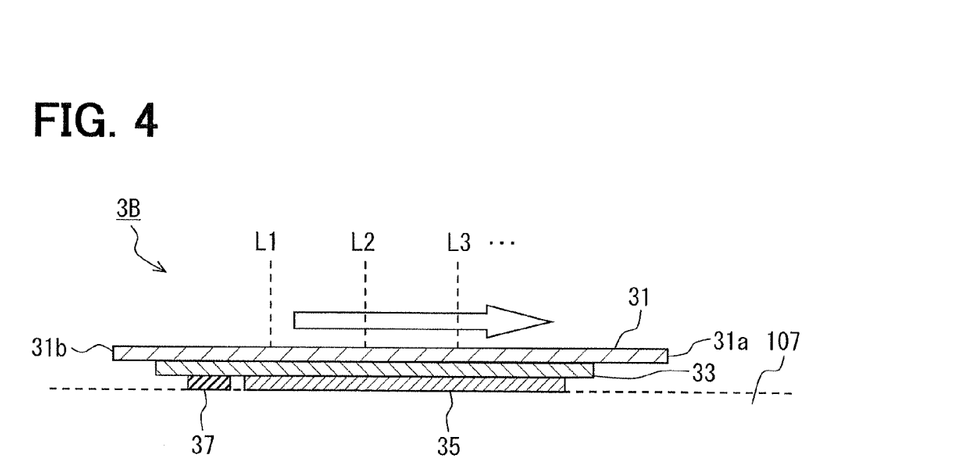
FIG. 4 is a cross sectional view of a ribbon switch.

Next, the ribbon switch 3B is explained with reference to FIG. 4. The ribbon switch 3B includes a ribbon 31, which has a shape of a rectangle and is made of cloth; a substrate 33; a detection sensor 35; and an LSI 37. The detection sensor 35 is a well-known touch sensor of a resistance film.

The substrate 33 is attached to a lower surface of the above ribbon 31. The detection sensor 35 and the LSI 37 are attached to a lower surface of the substrate 33. In the ribbon 31, an exposed area is prepared so to be close to each of the both ends 31a, 31b in the longitudinal direction or longer direction as being uncovered by the substrate 33, as illustrated in FIG. 4. Such an exposed area of the ribbon 31 may be used to adhere to a double-stick tape, thereby enabling the adhesion between the ribbon switch 3B and the attachment target member 107.

The above configuration provides a state where the ribbon switch 3B is attached to the attachment target member 107. In this state, when the user touches the ribbon 31 with a finger on the upper surface, the detection sensor 35 detects that the user's manipulation is made. In addition, the detection sensor 35 detects which position on the upper surface of the ribbon switch 3B the finger touches. It is noted that such a position is exemplified by positions L1, L2, L3, . . . along the longitudinal direction of the ribbon switch 3B, as illustrated in FIG. 4. As mentioned above, the detection sensor 35 functions as a detection portion 9.

When the detection sensor 35 detects the user's manipulation, the LSI 37 transmits ID information and device information. The ID information indicates an ID unique to the ribbon switch 3B. The device information relative to the ribbon switch 3B contains (i) manipulation detection information, (ii) position information, and (iii) clock time information. The manipulation detection information indicates the detection itself of the user's manipulation. The position information indicates the position of the ribbon switch 3B the user touches. The clock time information indicates a clock time when the user's manipulation is detected. It is noted that the LSI 37 is a well-known ID tag, and previously stores an ID unique to the ribbon switch 3B. In addition, the substrate 33 is provided with an antenna of the ID tag, and can transmit the ID information and the device information. That is, the LSI 37 and the substrate 33 function as a device information transmission portion 11.

The ribbon switch 3B can be attached to an optional position in the vehicle compartment, by using the double-stick tape or the like. For example, as illustrated in FIG. 3, any one of positions P1 to P6 on the steering wheel and positions P7 to P8 on an instrument panel can be selected as an arrangement or attachment position. Furthermore, a position other than the positions P1 to P8 in FIG. 3 may be selected as needed as an arrangement position or attachment position.

3. Process Executed by Manipulating Device

Figure 5:
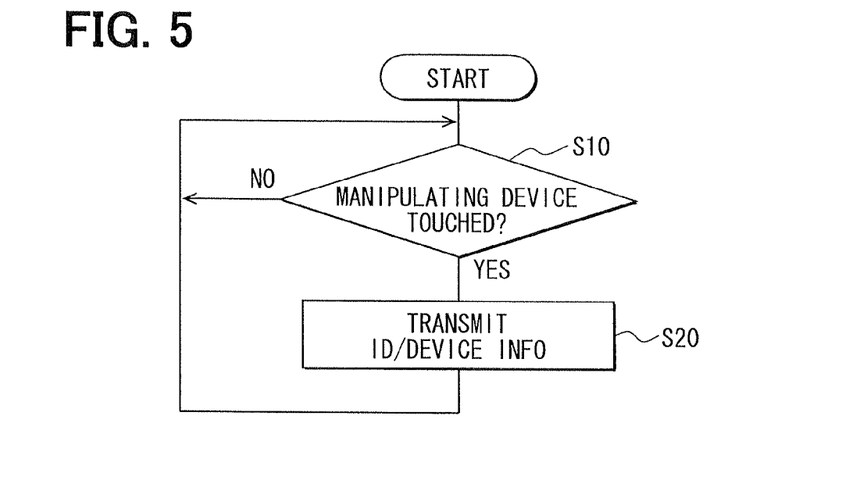
FIG. 5 is a flowchart illustrating a process executed by the manipulating device.

A process which the manipulating device 3 executes is explained with reference to a flowchart of FIG. 5. This process is continuously executed during the period when a power source of the in-vehicle instrument operating apparatus 1 is set in an ON state.

It is further noted that a flowchart or the processing of the flowchart in the present application includes sections (also referred to as steps), which are represented, for instance, as S10. Further, each section can be divided into several subsections while several sections can be combined into a single section. Furthermore, each of thus configured sections can be referred to as a means or unit and achieved not only as a software device but also as a hardware device.

At S10, the detection portion 9 determines whether the user touches the manipulating device 3. When the manipulating device 3 is the button switch 3A, whether the user's manipulation is detected is determined by determining whether the tact switch 23 is turned into the ON state. When the manipulating device 3 is the ribbon switch 3B, whether the user's manipulation is detected is determined based on a detection result of the detection sensor 35.

When it is determined that the manipulating device 3 is touched by the user, the processing proceeds to S20. When it is determined that the manipulating device 3 is not touched, the processing repeats S10. At S20, the device information transmission portion 11 transmits the ID information and device information of the manipulating device 3 that is determined to be touched by the user at S10.

4. Process Executed by Tag Reader and Control Database

Figure 6:
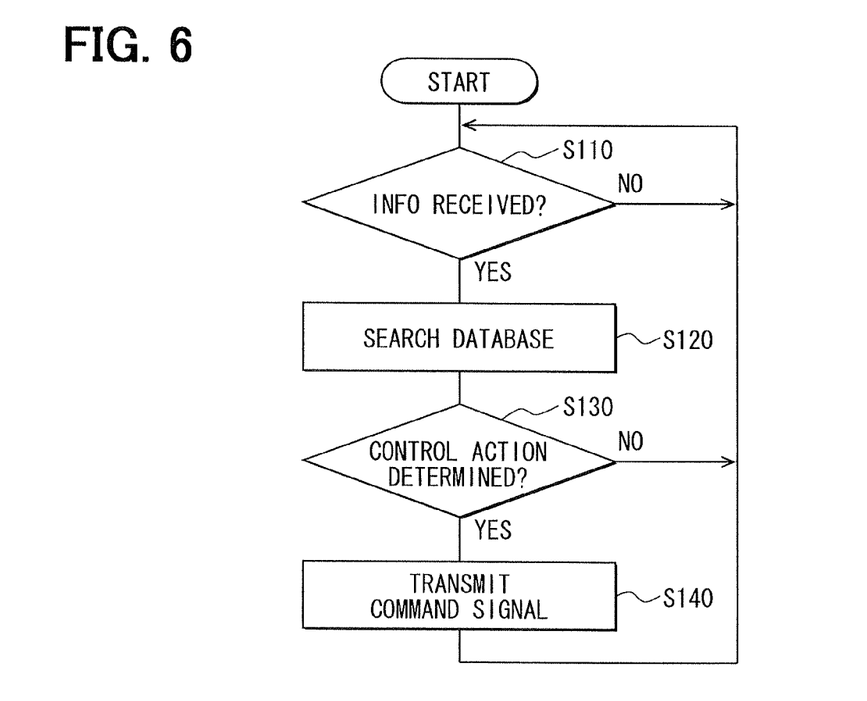
FIG. 6 is a flowchart illustrating a process executed by a tag reader and a control database.

The process executed by the tag reader 5 and the control database 7 is explained with reference to FIG. 6. This process is continuously executed during the period when a power source of the in-vehicle instrument operating apparatus 1 is set in an ON state.

At S110, it is determined whether the reception portion 13 receives the ID information and device information which the manipulating device 3 transmits. When receiving the information, the processing proceeds to S120; when not receiving, the processing repeats S110.

At S120, the control database 7 is searched using a keyword that is the ID information and device information received at S110, thereby determining a corresponding control action. That is, the corresponding control action is previously stored in the control database 7 with respect to the combination of the ID information and device information. If the ID information and device information which are received at S110 are used as a keyword for the search, the corresponding control action can be determined. For example, when the received ID information and device information pertinent or correspond to a predetermined button switch 3A, the control action may be as follows.

Control action to execute a switchover between the ON state and the OFF state of the power source in the audio 103

Control action to execute a switchover between the ON state and the OFF state of the power source in the air-conditioner 105

Control action to execute a changeover of modes of the air-conditioner 105

Further, the controlled or operated in-vehicle instrument may be previously associated with the received ID information, for instance. In such a case, the manipulating device 3 is designed so as to be enabled to operate the in-vehicle instrument that is previously associated with. Further, one in-vehicle instrument may be associated with a single manipulating device 3, or associated with several manipulating devices 3. When one in-vehicle instrument is associated with the several manipulating devices 3, the several manipulation devices 3 may share the executions of several kinds of control actions relative to the in-vehicle instrument.

In addition, when the received ID information and device information are from the predetermined ribbon switch 3B, the control action can be determined according to a time-course variation of the manipulation of the user, as explained below.

The device information transmitted from the ribbon switch 3B contains position information and clock time information. The ribbon switch 3B thereby carries out repetitive transmissions of position information and clock time information with predetermined time intervals. The tag reader 5 can record temporally the position information and the clock time information received from the same ribbon switch 3B that has the same ID information. Therefore, when user moves the finger while touching the ribbon switch 3B with the finger such that the finger slides over the front surface of the ribbon switch 3B, the tag reader 5 thus receives one by one a plurality of the position information indicating the location L1 of the finger at time t1, the position information indicating the location L2 of the finger at time t2, the position information indicating the location L3 of the finger at time t3, . . . . The tag reader 5 can calculate the movement velocity of the finger, which moves along the front surface of the ribbon switch 3B, using the received information. In addition, the tag reader 5 can detect the direction of the movement of the finger. When the clock time contained in the clock time information is earlier than the present time by a predetermined time period, it is not used to calculate the movement velocity or the movement direction of the finger.

The tag reader 5 searches the control database 7 with a keyword of the ID information and the above calculated movement velocity and movement direction of the finger, thereby determining the control action. That is, the control action is determined so as to be differentiated depending on the ID information and the movement velocity and movement direction of the finger which touches the ribbon switch 3B. Therefore, the user can execute different controls or control actions by changing the movement velocity and movement direction of the finger touching the ribbon switch 3B. The control actions are exemplified as follows.

Control action which executes a music transfer and an album transfer in the audio 103

Control action which changes the sound volume of the audio 103

Control action which changes zoom-in/zoom-out of a map in the navigation system 101

Control action which executes increase or decrease in the setting temperature of the air-conditioner 105

At S130, it is determined whether the control action is determined. When it is determined, the processing proceeds to S140; when it is not determined the processing returns to S110.

At S140, a command signal having one-to-one correspondence with the determined control action is transmitted by the wireless communications to the corresponding in-vehicle instrument. The ECU of the in-vehicle instrument executes the action that is determined by the command signal, i.e., the control action that is determined at S230.

5. Effect Provided by In-Vehicle Instrument Operating Apparatus (1) In the in-vehicle instrument operating apparatus 1, the arrangement position(s) of the manipulating device(s) 3 is freely changeable. Therefore, the user can attach the manipulating device 3 to the position at which it is easy to manipulate. In particular, the communication between the manipulating device 3 and the tag reader 5 is executed wirelessly. This can reduce the restriction with respect to the arrangement position of the manipulating device 3. As a result, in the case that the driver would like to manipulate the manipulating device 3 while executing the driving manipulation or operation, the need of looking for the manipulating device 3 can be reduced, thereby preventing the concentration on the driving operation from lowering.

(2) In the in-vehicle instrument operating apparatus 1, it is not necessary to arrange in the vehicle compartment a manipulating device 3, which is unnecessary for the user, out of the several manipulating devices 3. This enables the reduction in the number of manipulating devices 3; the position(s) of the manipulating device(s) 3 can become much more recognizable. The communication between the manipulating device 3 and the tag reader 5 is executed by wireless communications; thus, even if a part of the manipulating devices 3 is not used, any disadvantage does not arise in the tag reader 5.

The present invention is not limited to the above mentioned embodiment at all. It can be achieved in various manners within a scope not departing from the present invention. For example, the manipulating device 3 is not limited to the types that are mentioned above, but may be a widely used well-known manipulating device such as a slide switch.

In addition, the manipulating device 3 may be in a seal state (film state), thereby enabling ornaments on an upper surface. In addition, in the above embodiment, the wireless communications technology or method may use an RFID (Radio Frequency Identification). Without need to be limited thereto, another method may be used such as an infrared communications method, and an electromagnetic induction method.

In addition, in the above embodiment, the power may be supplied using the RFID (Radio Frequency Identification) from an outside of the manipulating device. Another well-known method may be adopted such as an electromagnetic induction method, or a magnetic resonance method. In addition, a battery may be built in the manipulating device 3; thus, the power may be supplied from the battery. However, when an electric power can be supplied from the outside (wireless or contact-less power supply), a changing battery is unnecessary and the size can be reduced. This provides an advantage.

In addition, the present invention can be directed to an instrument operating apparatus (a remote operation apparatus) to operate an instrument other than the in-vehicle instrument while the basic configuration remains the same. For example, the present invention can be applied to an operation apparatus to remotely operate a household appliance. In this, case, the configuration of the instrument operating apparatus may be basically unchanged; a command signal may be wirelessly transmitted to a control IC of the household appliance, instead of the ECU of the in-vehicle instrument. Such a household appliance may include an audio component stereo, for example. In such a case, the instrument operation apparatus may transmit wirelessly a command signal to a control IC of the audio component stereo; the play or stop of the audio component stereo can be executed by the command signal.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, an instrument operating apparatus, which transmits a command signal to operate an instrument according to a manipulation of a user, is provided as follows. At least one manipulating device includes a detection portion to detect the manipulation of the user, and a device information transmission portion to transmit device information according to the manipulation detected by the detection portion using a wireless communications technology. A reception portion is to receive the device information A control circuit is to determine the command signal according to the device information received by the reception portion. A command signal transmission portion is to transmit the command signal to the instrument. Herein an arrangement position at which the manipulating device is arranged is enabled to be changed.

As an optional aspect of the instrument operating apparatus, the at least one manipulating device may be a plurality of manipulating devices. Herein, the device information transmission portion and the reception portion may transmit and receive, respectively, the device information and the ID information with respect to one of the plurality of manipulating devices; and the control circuit may determine based on the ID information, the command signal with respect to the one of the plurality of manipulating devices.

Such a configuration enables the determination of the command signal different depending on one of the manipulating devices; as the result, a control can be executed with respect to the one of the manipulating devices.

Furthermore, in the above in-vehicle instrument operating apparatus, it is not necessary to arrange in the vehicle compartment a manipulating device that is unnecessary for the user out of the several manipulating devices. This enables the reduction in the number of manipulating devices; the arrangement positions of the manipulating devices can become much more recognizable. Further, the communication between each manipulating device and the reception portion is executed by wireless communications; thus, even if one or some of the manipulating devices are not used, a disadvantage may not arise easily in the reception portion or the control circuit.

It is noted that the instrument (e.g. an in-vehicle instrument) may be designed to have a manipulating means or an operating means (for example, a touch panel or a speech recognition portion or means) in addition to the manipulating device concerning the present invention. Therefore, it is unnecessary to provide an instrument with the instrument operating apparatus or manipulating device concerning the present invention for operating the instrument. That is, for instance, when a predetermined instrument is intended to be manipulated at hand of the user, a manipulating device may be selected to correspond to the predetermined instrument and attached or arranged in a vehicle compartment, etc.

As an optional aspect of the instrument operating apparatus the device information may indicate (i) the detecting of the manipulation and (ii) a clock time when the manipulation is detected. The control circuit may determine the command signal according to a temporal change of the manipulation.

Thereby, the various command signals can be selectively determined. As a result, the various controls can be executed to instruments.

In addition, the device information may indicate the detecting of the user's manipulation itself, the clock time when the manipulation is detected, and the position information on the user's finger, for example. In such a case, the control circuit may acquire the positions of the user's finger temporally, for example; the command signal may be determined according to the temporal change (for example, with respect to the moving speed or moving direction of the finger). Thereby, the various command signals can be selectively determined. As a result, the various controls can be executed to an instrument.

Further, the method to arrange or attach the manipulating device is not limited, in particular. For example, it can be attached with an adhesive material, double-stick tape, etc. In addition, it may be attached using a fixture such as a clip. The present invention control device apparatus can be used as the in-vehicle instrument manipulation apparatus which transmits the command signal for manipulating the in-vehicle instrument, for example according to manipulation by the user (passenger of the vehicle).

As an optional aspect of the instrument operating apparatus, the instrument may be an in-vehicle device mounted in a vehicle; and the manipulating device may be arranged in a compartment of the vehicle and the arrangement position of the manipulating device is enabled to be changed.

In addition all or part of the reception portion, the control circuit, and the command signal transmission portion may be also arranged in the vehicle.

In addition, the above instrument operating apparatus may be used as a remote operating apparatus to remotely operate an instrument other than the in-vehicle instrument.

As an optional aspect of the instrument operating apparatus, the manipulating device may be further configured to receive an electric power from an outside of the manipulating device.

It will be obvious to those skilled in the art that various changes may be made in the above-described embodiments of the present invention. However, the scope of the present invention should be determined by the following claims.

What is claimed:

1. An instrument operating apparatus in a vehicle that transmits a command signal to operate an instrument according to a manipulation of a user occupying the vehicle, the instrument operating apparatus comprising:
   at least one manipulating device including a detection portion to detect the manipulation of the user, and a device information transmission portion to transmit device information according to the manipulation detected by the detection portion using a wireless communications technology;
   a reception portion to receive the device information;
   a control circuit to determine the command signal according to the device information received by the reception portion; and
   a command signal transmission portion to transmit the command signal to the instrument,
   wherein the at least one manipulating device may be attached to and detached from an arrangement position, on an outer surface of a steering wheel of the vehicle, at which the manipulation device is arranged, via an adhesive material, and
   wherein the arrangement position on the outer surface of a steering wheel of the vehicle at which the at least one manipulating device is arranged is enabled to be optionally changed by the user occupying the vehicle.

2. The instrument operating apparatus according to claim 1,
   the at least one manipulating device including a plurality of manipulating devices, wherein:
   the device information transmission portion and the reception portion transmits and receives, respectively, the device information and the ID information with respect to one of the plurality of manipulating devices; and
   the control circuit determines, based on the ID information, the command signal with respect to the one of the plurality of manipulating devices.

3. The instrument operating apparatus according to claim 1,
   wherein the device information indicates (i) the detecting of the manipulation and (ii) a clock time when the manipulation is detected, the control circuit determining the command signal according to a temporal change of the manipulation.

4. The instrument operating apparatus according to claim 1, wherein:
   the user occupying the vehicle is a driver of the vehicle, and
   the arrangement position on the outer surface of the steering wheel of the vehicle is enabled to be changed to an arrangement position on an instrument panel in front of the driver.

5. The instrument operating apparatus according to claim 1,
   the at least one manipulating device being further configured to receive an electric power from an outside of the at least one manipulating device.

6. The instrument operating apparatus according to claim 1, wherein:
   the instrument includes an in-vehicle device mounted in the vehicle.

7. The instrument operating apparatus according to claim 1, wherein:
   the at least one manipulating device includes a plurality of manipulating devices;
   the instrument includes a plurality of different control actions while the command signal is transmitted to operate one of the different control actions;
   one-to-one correspondence between the plurality of manipulating devices and the plurality of different control actions of the instrument is previously stored in a database storage;
   the device information transmission portion and the reception portion transmits and receives, respectively, the device information with respect to one of the plurality of manipulating devices; and
   the control circuit determines, based on the stored one-to-one correspondence, the command signal to operate one of the different control actions corresponding to the one of the plurality of manipulating devices.

8. The instrument operating apparatus according to claim 1, wherein:
the at least one manipulating device includes a plurality of manipulating devices; and
a number of the plurality of manipulating devices is enabled to be reduced by the user optionally.

9. The instrument operating apparatus according to claim 1,
the at least one manipulating device including a plurality of manipulating devices, wherein:
the device information transmission portion and the reception portion transmits and receives, respectively, the device information and ID information with respect to one of the plurality of manipulating devices;
the control circuit determines, based on the ID information, the command signal with respect to the one of the plurality of manipulating devices; and
an arrangement position at which one of the plurality of manipulating devices is arranged is enabled to be changed independently of arrangement positions of the others of the plurality of manipulating devices.

10. An in-vehicle instrument operating apparatus mounted to a vehicle for transmitting a command signal to operate an in-vehicle instrument according to a manipulation of an occupant of the vehicle, the in-vehicle instrument operating apparatus comprising:
at least one manipulating device containing a detection portion to detect the manipulation of the occupant, and a device information transmission portion to transmit device information according to the manipulation detected by the detection portion using wireless communication,
the at least one manipulating device being attached to an attachment position on an outer surface of a steering wheel of the vehicle;
a reception portion disposed separate from the at least one manipulating device to receive the device information from the at least one manipulating device via the wireless communication;
a control circuit to determine the command signal according to the device information received by the reception portion; and
a command signal transmission portion to transmit the command signal to the in-vehicle instrument,
wherein the occupant of the vehicle is enabled to detach the at least one manipulating device, which was attached to the attachment position via an adhesive material, and move the at least one manipulating device to an optional attachment position.

11. The instrument operating apparatus according to claim 10, wherein:
the occupant of the vehicle is a driver of the vehicle.

12. The instrument operating apparatus according to claim 11, wherein:
the optional attachment position is either on the outer surface of the steering wheel or on an instrument panel in front of the driver.

13. The instrument operating apparatus according to claim 10, the at least one manipulating device including a plurality of manipulating devices, wherein:
the device information transmission portion and the reception portion transmits and receives, respectively, the device information and ID information with respect to one of the plurality of manipulating devices; and
the control circuit determines, based on the ID information, the command signal with respect to the one of the plurality of manipulating devices.

14. The instrument operating apparatus according to claim 10, wherein:
the device information indicates (i) the detecting of the manipulation and (ii) a clock time when the manipulation is detected, the control circuit determining the command signal according to a temporal change of the manipulation.

15. The instrument operating apparatus according to claim 10,
the at least one manipulating device being further configured to receive an electric power from an outside of the at least one manipulating device.

16. The instrument operating apparatus according to claim 10, wherein:
the at least one manipulating device includes a plurality of manipulating devices;
the instrument includes a plurality of different control actions while the command signal is transmitted to operate one of the different control actions;
one-to-one correspondence between the plurality of manipulating devices and the plurality of different control actions of the instrument is previously stored in a database storage;
the device information transmission portion and the reception portion transmits and receives, respectively, the device information with respect to one of the plurality of manipulating devices; and
the control circuit determines, based on the stored one-to-one correspondence, the command signal to operate one of the different control actions corresponding to the one of the plurality of manipulating devices.

17. The instrument operating apparatus according to claim 10, wherein:
the at least one manipulating device includes a plurality of manipulating devices; and
a number of the plurality of manipulating devices is enabled to be reduced by the occupant optionally.

18. An in-vehicle instrument operating apparatus mounted to a vehicle for transmitting a command signal to operate an in-vehicle instrument according to a manipulation of a driver of the vehicle, the in-vehicle instrument operating apparatus comprising:
at least one manipulating device containing a detection portion to detect the manipulation of the driver, and a device information transmission portion to transmit device information according to the manipulation detected by the detection portion using wireless communication, the at least one manipulating device being attached by using an adhesive material to an attachment position on an outer surface of a steering wheel of the vehicle;
a reception portion disposed separate from the at least one manipulating device to receive the device information from the at least one manipulating device via the wireless communication;
a control circuit to determine the command signal according to the device information received by the reception portion; and
a command signal transmission portion to transmit the command signal to the in-vehicle instrument,
wherein the driver of the vehicle is enabled to detach the manipulating device, which was attached to the attachment position, and move the at least one manipulating device to an optional attachment position.

* * * * *